US012791692B2

(12) United States Patent
Jiang et al.

(10) Patent No.: US 12,791,692 B2
(45) Date of Patent: Nov. 10, 2026

(54) ULTRASONIC SENSOR AND CONTROL METHOD THEREOF

(71) Applicant: QISDA CORPORATION, Taoyuan City (TW)

(72) Inventors: Fu-Sheng Jiang, Taoyuan City (TW); Pei-Lun Song, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 163 days.

(21) Appl. No.: 18/937,043

(22) Filed: Nov. 5, 2024

(65) Prior Publication Data

US 2025/0155562 A1 May 15, 2025

(30) Foreign Application Priority Data

Nov. 9, 2023 (TW) ................................ 112143246

(51) Int. Cl.
*G01S 15/89* (2006.01)
*G01S 7/521* (2006.01)

(52) U.S. Cl.
CPC .............. *G01S 7/521* (2013.01); *G01S 15/89* (2013.01)

(58) Field of Classification Search
CPC ................................ G01S 7/521; G01S 15/89
See application file for complete search history.

(56) References Cited

U.S. PATENT DOCUMENTS

| | | | | |
|---|---|---|---|---|
| 9,499,395 | B2 * | 11/2016 | Rothberg | B06B 1/02 |
| 9,505,030 | B2 * | 11/2016 | Rothberg | A61B 8/00 |
| 2014/0355381 | A1 * | 12/2014 | Lal | G06N 3/04 327/356 |
| 2020/0020732 | A1 * | 1/2020 | Bu | G01S 15/08 |
| 2022/0314274 | A1 * | 10/2022 | Meynier | B06B 1/0292 |
| 2024/0288579 | A1 * | 8/2024 | Boulme | G01S 7/52085 |

OTHER PUBLICATIONS

Daya et al., Compensated Row-Column Ultrasound Imaging System Using Multilayered Edge Guided Stochastically Fully Connected Random Fields, Scientific Reports, Sep. 6, 2017, www.nature.com.

* cited by examiner

*Primary Examiner* — Krystine E Breier
(74) *Attorney, Agent, or Firm* — Winston Hsu

(57) ABSTRACT

An ultrasonic sensor includes M rows of first capacitance micromachined ultrasonic transducers (CMUTs) and N columns of second CMUTs, where M and N are both greater than 1. Each first CMUT has a plurality of first electrodes, a second electrode, and a third electrode for receiving a reference voltage, a first direct current voltage, and a first alternating current voltage, respectively. A first cavity is formed between each first electrode and the second electrode. Each second CMUT has a plurality of fourth electrodes, a fifth electrode, and a sixth electrode for receiving the reference voltage, receiving a second direct current voltage, and generating a second alternating current voltage, respectively. A second cavity is formed between each fourth electrode and the fifth electrode.

12 Claims, 8 Drawing Sheets

ULTRASONIC SENSOR AND CONTROL METHOD THEREOF

BACKGROUND OF THE INVENTION

1. Field of the Invention

The invention relates to an ultrasonic sensor and its control method, especially to an ultrasonic sensor with a capacitance micromachined ultrasonic transducer (CMUT) and its control method.

2. Description of the Prior Art

A capacitive micromachined ultrasonic transducer (CMUT) is a type of ultrasonic transducer that uses the principle of capacitance to generate and detect ultrasound waves. A CMUT has a ground electrode and a membrane, with another electrode located on the membrane. When the CMUT is in a transmission mode, the ground electrode is grounded and the electrode on the membrane is applied with a direct-current (DC) voltage and an alternating-current (AC) voltage. The DC voltage causes the membrane to deflect towards the ground electrode, while the AC voltage causes the membrane to vibrate, generating ultrasound waves. However, if only an AC voltage is applied, the vibration of the membrane will not be large enough. Therefore, in order to generate a sufficiently large vibration of the membrane, both a DC voltage and an AC voltage must be applied. However, since both the DC voltage and the AC voltage are applied to the same electrode on the membrane, they cannot be controlled separately.

When the CMUT is in a receive mode, the ground electrode is grounded and the electrode on the membrane is applied with a DC voltage. The distance between the membrane and the ground electrode changes due to the ultrasound waves, which causes a corresponding change in the capacitance between the membrane and the ground electrode and the amount of charges stored on the electrode on the membrane. This in turn causes the electrode on the membrane to output a corresponding AC voltage. However, if no DC voltage is applied to the electrode on the membrane when the CMUT is in the receive mode, the membrane will not be able to generate a sufficiently large vibration in the receive mode of the CMUT, which will result in an insufficient amplitude of the AC voltage output by the electrode on the membrane, increasing the difficulty of measurement. Therefore, in order for the membrane to generate a sufficiently large vibration in the receive mode of the CMUT, a DC voltage must be applied to the electrode on the membrane. However, since the application of the DC voltage and the output of the AC voltage are both through the same electrode on the membrane, and there is a certain switching time required for the electrode on the membrane to switch from a state where a DC voltage is applied to a state where no DC voltage is applied, if the switching of its state cannot be completed immediately, it will cause serious distortion of the CMUT image.

SUMMARY OF THE INVENTION

One embodiment of the present invention provides an ultrasonic sensor. The ultrasonic sensor comprises a plurality of first capacitive micromachined ultrasonic transducers (CMUTs), and a plurality of second CMUTs. The first CMUTs are arranged in M rows. M is an integer greater than 1. Each first CMUT comprises a plurality of first electrodes, a second electrode, and a third electrode. The first electrodes are used to receive a first reference voltage, the second electrode is used to receive a first direct-current (DC) voltage, and the third electrode is used to receive a first alternating-current (AC) voltage. The first DC voltage is different from the first reference voltage. A plurality of first cavities are formed between the first electrodes and the second electrode. The second CMUTs are arranged in N columns. N is an integer greater than 1. The M rows are intersected with the N columns. Each second CMUT comprises a plurality of fourth electrodes, a fifth electrode, and a sixth electrode. The fourth electrodes are used to receive a second reference voltage, the fifth electrode is used to receive a second DC voltage, and the sixth electrode is used to generate a second AC voltage. A plurality of second cavities are formed between the fourth electrodes and the fifth electrode. The second DC voltage is different from the second reference voltage.

Another embodiment of the present invention provides a method for controlling an ultrasonic sensor. The ultrasonic sensor comprises a plurality of first capacitance micromachined ultrasonic transducers (CMUTs) arranged in M rows, and a plurality of second CMUTs arranged in N columns. M and N are integers greater than 1. Each first CMUT comprises a plurality of first electrodes, a second electrode, and a third electrode. A plurality of first cavities are formed between the first electrodes and the second electrode. Each second CMUT comprises a plurality of fourth electrodes, a fifth electrode, and a sixth electrode. A plurality of second cavities are formed between the fourth electrodes and the fifth electrode. The method comprises applying a first reference voltage to first electrodes of first CMUTs arranged in a plurality of selected rows of the M rows when the ultrasonic sensor is in a transmission mode; applying a first direct-current (DC) to second electrodes of the first CMUTs arranged in the plurality of selected rows of the M rows when the ultrasonic sensor is in the transmission mode; applying an alternating-current (AC) voltage to third electrodes of the first CMUTs arranged in the plurality of selected rows of the M rows when the ultrasonic sensor is in the transmission mode; applying a second reference voltage to fourth electrodes of second CMUTs arranged in a plurality of selected columns of the N columns when the ultrasonic sensor is in a receive mode; applying a second DC voltage to fifth electrodes of the second CMUTs arranged in the plurality of selected columns of the N columns when the ultrasonic sensor is in the receive mode; and receiving alternating-current (AC) voltages generated by sixth electrodes of the second CMUTs arranged in the plurality of selected columns of the N columns when the ultrasonic sensor is in the receive mode. The first DC voltage is different from the first reference voltage, and the second DC voltage is different from the second reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
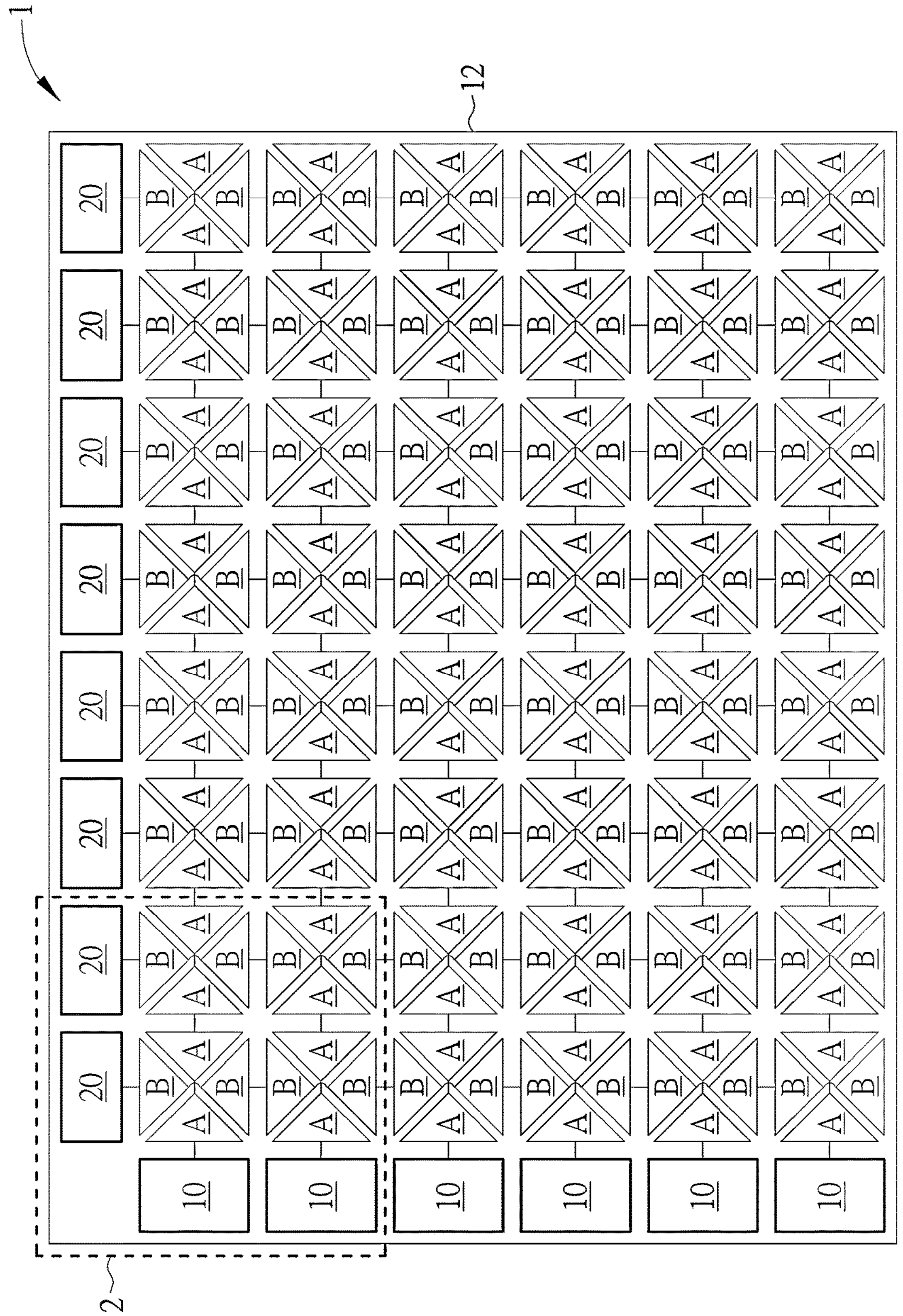
FIG. 1 is a top view of an ultrasonic sensor in an embodiment of the present invention.

The present invention can be understood by referring to the following detailed description and the accompanying drawings. It should be noted that in order to make it easier for the reader to understand and for the sake of simplicity of the drawings, only a portion of the electronic device is shown in many of the drawings in the present invention, and the specific components in the drawings are not drawn to scale. In addition, the number and size of the components in the drawings are only for illustration purposes and do not limit the scope of the present invention.

Certain terms will be used throughout the specification and in the appended claims to refer to specific components. It should be understood by those skilled in the art that different names may be used by different manufacturers of electronic devices to refer to the same component. It is not intended herein to distinguish between components that are different in name but identical in function. In the following description and claims, the terms "comprising" and "including" are open-ended terms and should be interpreted as meaning "comprising but not limited to . . . ".

It should be understood that when a component or layer is referred to as being "on" another component or layer, "disposed on" another component or layer, or "connected to" another component or layer, it may be directly on or directly connected to the other component or layer, or there may be intervening components or layers (non-direct case) between the two. Conversely, when a component is referred to as being "directly on" another component or layer, "directly disposed on" another component or layer, or "directly connected to" another component or layer, there are no intervening components or layers between the two.

Electrical connection can be direct or indirect. Electrical connection of two components can be by direct contact to transmit electrical signals, with no other components between them. Electrical connection of two components can be through a conductive medium between them to transmit electrical signals. Coupling of two components can be without a conductive medium between the two components, but the two components can form a capacitance through a medium.

Although the terms first, second, third, etc. may be used to describe a plurality of components, the components are not limited to these terms. These terms are used only to distinguish a single component from other components in the specification. The same terms may not be used in the claims, and the first, second, third, etc. may be replaced by the order in which the components are claimed. Therefore, the first component in the following description may be the second component in the claims.

Figure 2:
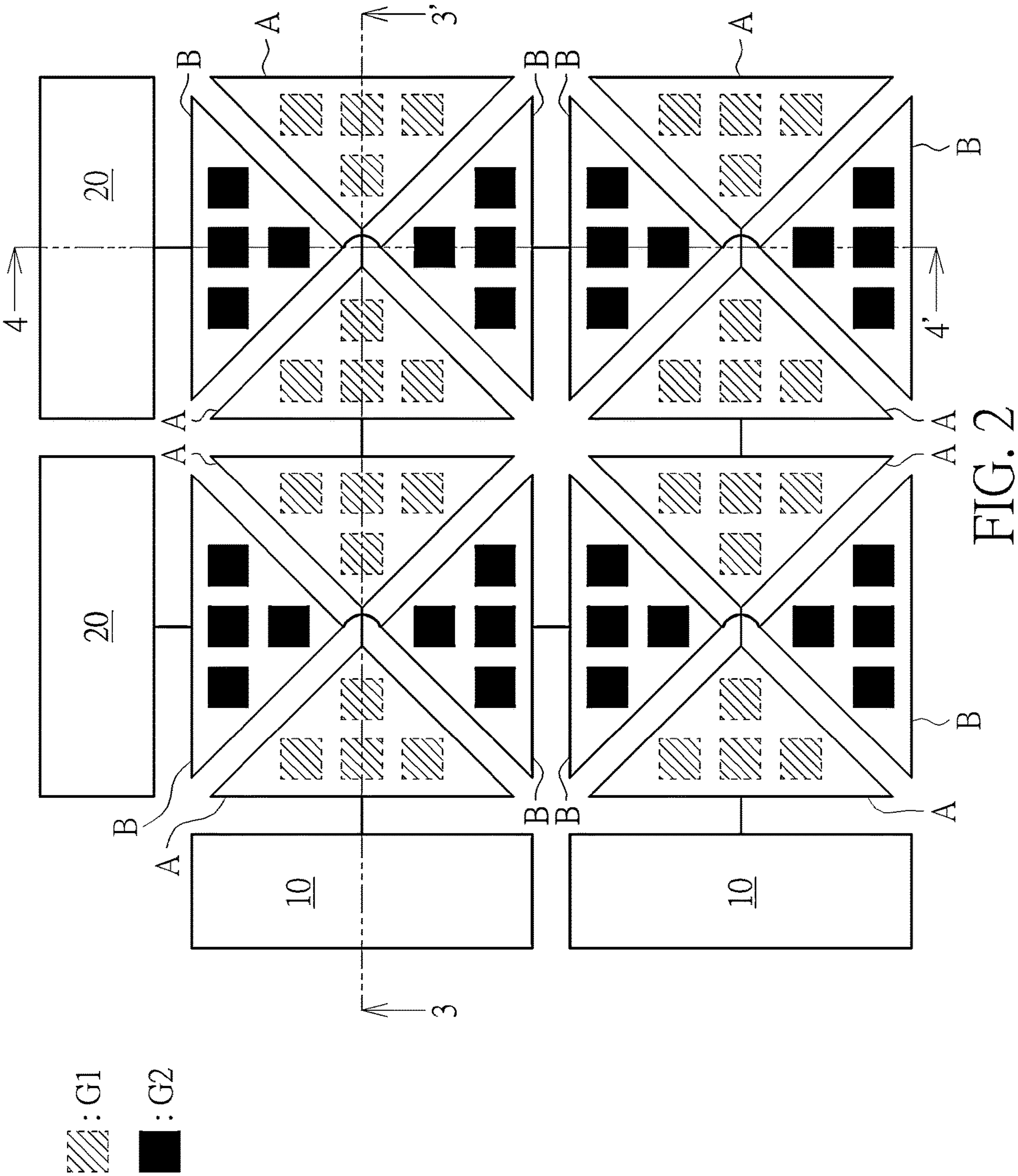
FIG. 2 is an enlarged view of a region of the ultrasonic sensor in FIG. 1.

Please refer to FIGS. 1 and 2. FIG. 1 is a top view of an ultrasonic sensor 1 in an embodiment of the present invention, and FIG. 2 is an enlarged view of a region 2 of the ultrasonic sensor 1 shown in FIG. 1. The ultrasonic sensor 1 comprises a plurality of first capacitance micromachined ultrasonic transducers (CMUTs) A arranged in M rows and a plurality of second CMUTs B arranged in N columns. Both M and N are integers greater than 1. In the embodiment, M equals 6 and N equals 8, but the invention is not limited thereto, M and N can be other integers greater than 1. The first CMUTs A in the M rows and the second CMUTs B in the N columns are set up in a cross arrangement. That is, the M rows are intersected with the N columns. Each first CMUT A has a plurality of first cavities G1, and each second CMUT B has a plurality of second cavities G2.

Figure 3:
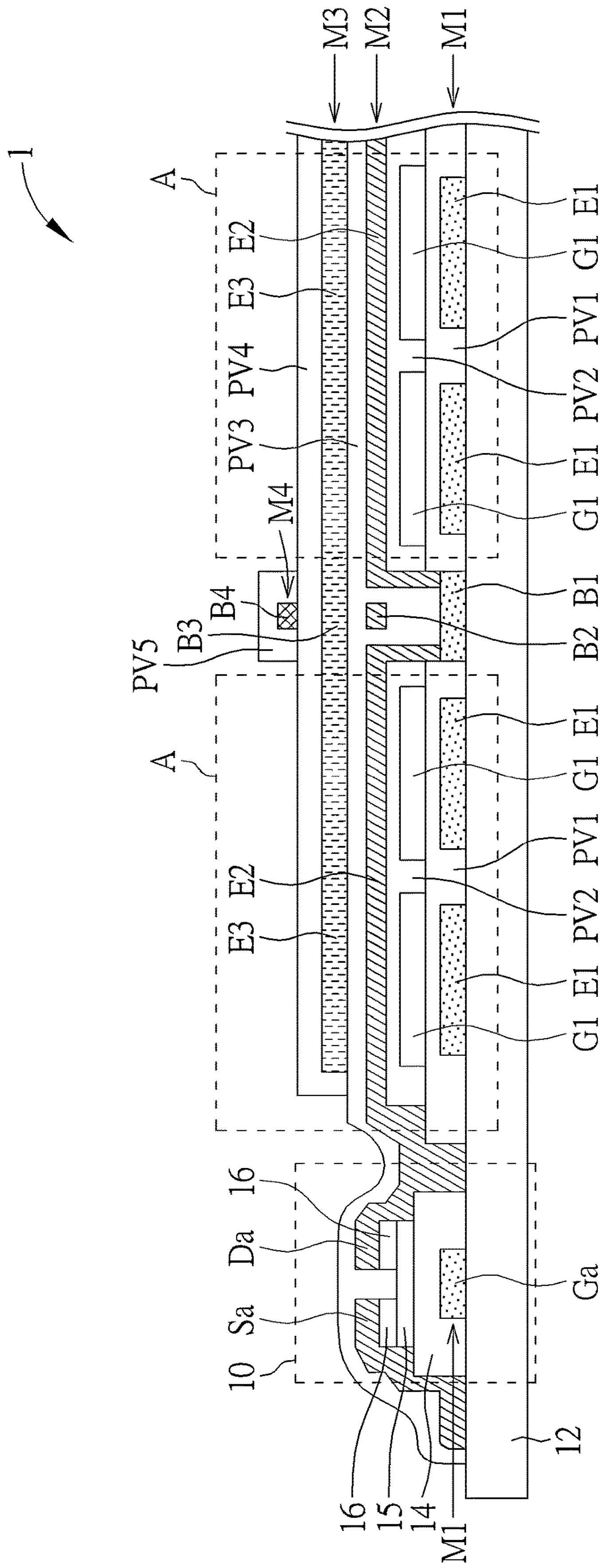
FIG. 3 is a sectional view along section line 3-3' of the region of the ultrasonic sensor in FIG. 2.
Figure 4:
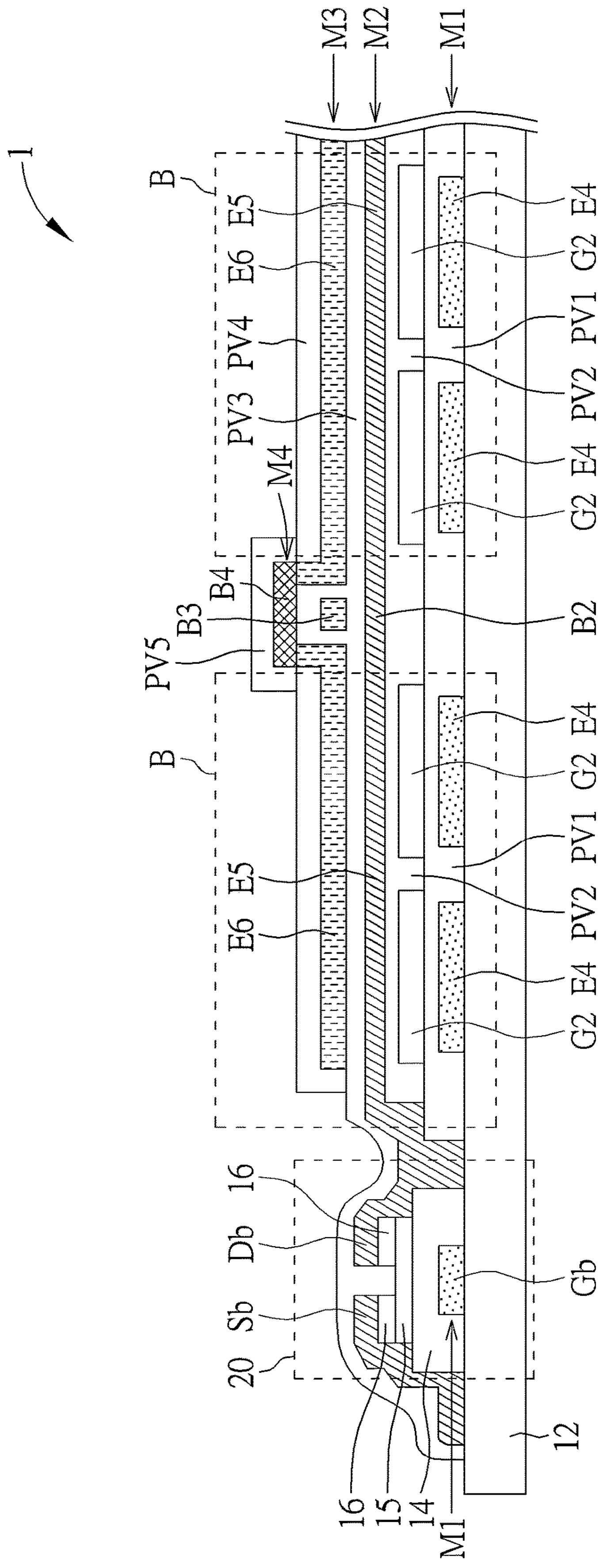
FIG. 4 is a sectional view along section line 4-4' of the region of the ultrasonic sensor in FIG. 2.

Please refer to FIGS. 3 and 4. FIG. 3 is a sectional view along section line 3-3' of the region 2 of the ultrasonic sensor 1 in FIG. 2, and FIG. 4 is a sectional view along section line 4-4' of the region 2 of the ultrasonic sensor 1 in FIG. 2. The ultrasonic sensor 1 comprises a substrate 12, a first metal layer M1, a first insulating layer PV1, a second metal layer M2, a second insulating layer PV2, a third insulating layer PV3, a third metal layer M3, a fourth insulating layer PV4, a fourth metal layer M4, and a fifth insulating layer PV5. The first metal layer M1 is formed on the substrate 12, and the first metal layer M1 can be divided into a plurality of portions, e.g., electrodes E1 and E4, by etching. The first insulating layer PV1 is formed on the first metal layer M1. The plurality of first cavities G1 and the plurality of second cavities G2 are formed between the second insulating layer PV2 and the first insulating layer PV1. The second metal layer M2 is formed on the second insulating layer PV2, and the second metal layer M2 can be divided into a plurality of portions, e.g., electrodes E2 and E5, by etching. The third insulating layer PV3 is formed on the second metal layer M2. The third metal layer M3 is formed above the third insulating layer PV3. After etching, one or more required portions, e.g., electrodes E3 and E6, of the third metal layer M3 can be retained. The fourth insulating layer PV4 is formed on the third metal layer M3. The fourth metal layer M4 is formed on the fourth insulating layer PV4. After etching, one or more required portions, e.g., a bridge block B4, of the fourth metal layer M4 can be retained. The fifth insulating layer PV5 is formed on the fourth metal layer M4. Each first CMUT A comprises a plurality of electrodes E1, an electrode E2, and an electrode E3. A first cavity G1 is formed between each of the electrodes E1 and the electrode E2. Similarly, each second CMUT B comprises a plurality of electrodes E4, an electrode E5, and an electrode E6. A second cavity G2 is formed between each of the electrodes E4 and the electrode E2. In other embodiments, each metal layer and each insulating layer can be formed in the gaps of the photoresist pattern by physical vapor deposition (PVD), chemical vapor deposition (CVD), or other suitable methods.

Because the M rows of the first CMUTs A are intersected with the N columns of the second CMUTs B, and the electrodes E2 of the first CMUT A and the electrodes E5 of the second CMUT B are both formed in the second metal layer M2, in order to allow the electrodes E2 and E5 to operate independently without affecting each other, a bridge block B1 can be used to bridge the electrodes E2 in two adjacent first CMUTs A, and a bridge block B2 can be used to bridge the electrodes E5 in two adjacent second CMUTs B. In the embodiment, the bridge block B1 is formed in the first metal layer M1, and the bridge block B2 is formed in the second metal layer M2. Therefore, a plurality of electrodes E2 of the first CMUTs A in the same row are coupled to each other via the first metal layer M1, and a plurality of electrodes E5 of the second CMUTs B in the same column are coupled to each other via the second metal layer M2.

In another embodiment of the present invention, the bridge block B2 in the second metal layer M2 can be used to bridge the electrodes E2 in two adjacent first CMUTs A, and the bridge block B1 in the first metal layer M1 can be used to bridge the electrodes E5 in two adjacent second CMUTs B. Therefore, a plurality of electrodes E2 of the first CMUT A in the same row are coupled to each other via the second metal layer M2, and a plurality of electrodes E5 of the second CMUTs B in the same column are coupled to each other via the first metal layer M1.

In addition, because the first CMUTs A in M rows and the second CMUTs B in N columns are set up in a cross arrangement, and the electrodes E3 of the first CMUT A and the electrodes E6 of the second CMUT B are both formed in the third metal layer M3, in order to allow electrodes E3 and E6 to operate independently without affecting each other, the bridge block B3 can be used to bridge the electrodes E3 in two adjacent first CMUTs A, and the bridge block B4 can be used to bridge the electrodes E6 in two adjacent second CMUTs B. Here, the bridge block B3 is formed in the third metal layer M3, and the bridge block B4 is formed in the fourth metal layer M4. Therefore, a plurality of electrodes E3 of the first CMUT A in the same row are coupled to each other via the third metal layer M3, and a plurality of electrodes E6 of the second CMUTs B in the same column are coupled to each other via the fourth metal layer M4.

In another embodiment of the present invention, the bridge block B4 in the fourth metal layer M4 can be used to bridge the electrodes E3 in two adjacent first CMUTs A, and the bridge block B3 in the third metal layer M3 can be used to bridge the electrodes E6 in two adjacent second CMUTs B. Therefore, a plurality of electrodes E3 of the first CMUT A in the same row are coupled to each other via the fourth metal layer M4, and a plurality of electrodes E6 of the second CMUTs B in the same column are coupled to each other via the third metal layer M3.

In one embodiment of the present invention, the ultrasonic sensor 1 further comprises a semiconductor layer 15 formed between the substrate 12 and the second metal layer M2. The semiconductor layer 15, some portions of the first metal layer M1 and some portions of the second metal layer M2 form a plurality of first transistors 10 and a plurality of second transistors 20. Each first transistor 10 and each second transistor 20 can be a thin-film transistor (TFT). In detail, the first metal layer M1 forms not only electrodes E1 and E4, but also the gate Ga of the first transistor 10 and the gate Gb of the second transistor 20. The second metal layer M1 forms not only the electrodes E2 and E5, but also the source Sa and drain Da of the first transistor 10 and the source Sb and drain Db of the second transistor 20. The ultrasonic sensor 1 may further comprise an insulating layer 14 and an ohmic contact layer 16. The insulating layer 14 is formed between the semiconductor layer 15 and the portions of the first metal layer M1 that constitute the gates Ga and Gb, and the ohmic contact layer 16 is formed between the semiconductor layer 15 and the portions of the second metal layer M2 that constitute the source Sa, the drain Da, the source Sb, and the drain Db.

In one embodiment of the present invention, the ultrasonic sensor 1 generates ultrasonic waves through the first CMUTs A and receives reflected ultrasonic waves through the second CMUTs B. In another embodiment of the present invention, the ultrasonic sensor 1 generates ultrasonic waves through the second CMUTs B and receives reflected ultrasonic waves through the first CMUTs A.

Figure 5:
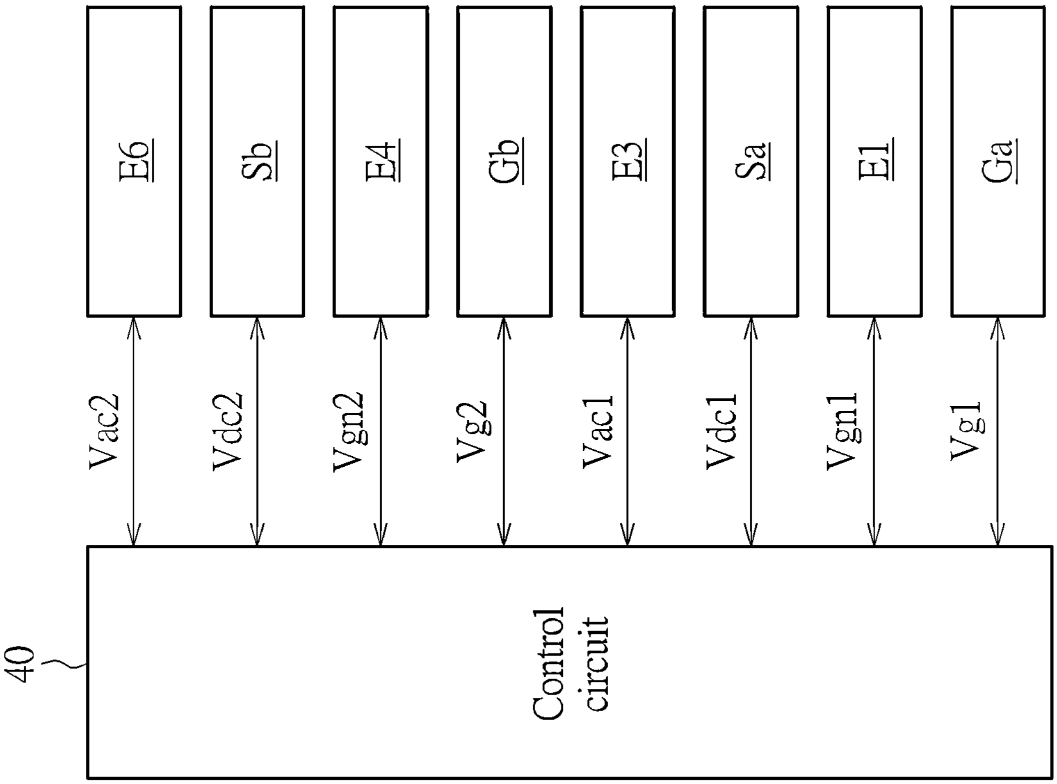
FIG. 5 is a schematic diagram illustrating the connection between the control circuit and the related electrodes of the ultrasonic sensor in FIG. 1.

A following embodiment of the present invention is illustrated by way of an example in which the ultrasonic sensor 1 generates ultrasonic waves through the first CMUTs A and receives reflected ultrasonic waves through the second CMUTs B. Please refer to FIG. 5, and also FIGS. 3 and 4. FIG. 5 is a schematic diagram illustrating the connection between the control circuit 40 and the related electrodes of the ultrasonic sensor 1 in FIG. 1. The control circuit 40 generates a control signal Vg1, a reference voltage Vgn1, a direct-current (DC) voltage Vdc1, an alternating-current (AC) voltage Vac1, another control signal Vg2, another reference voltage Vgn2, another DC voltage Vdc2, and another AC voltage Vac2. The control signal Vg1 is applied to the gate Ga to control the electrical connection between the source Sa and the drain Da of the first transistor 10, and the control signal Vg2 is applied to the gate Gb to control the electrical connection between the source Sb and the drain Db of the second transistor 20. The reference voltage Vgn1 and the reference voltage Vgn2 may be equal and may both be ground voltage. The reference voltage Vgn1 is not equal to the DC voltage Vdc1, and the reference voltage Vgn2 is not equal to the DC voltage Vdc2. The reference voltage Vgn1 is applied to the electrodes E1, and the reference voltage Vgn2 is applied to the electrodes E4. The DC voltage Vdc1 is applied to the source Sa, and the DC voltage Vdc2 is applied to the source Sb. In addition, the AC voltage Vac1 is applied to the electrode E3, and the electrode E6 outputs the AC voltage Vac2 to the control circuit 40.

When the ultrasonic sensor 1 is in the transmission mode, the reference voltage Vgn1 is applied to the electrodes E1, the DC voltage Vdc1 is applied to the source Sa, and the control signal Vg1 is applied to the gate Ga to turn on the first transistor 10, thereby transmitting the DC voltage Vdc1 to the electrode E2 via the source Sa and the drain Da. At this time, because the electrode E2 is applied with the DC voltage Vdc, and the electrodes E1 are applied with the reference voltage Vgn1, the electrode E2 will approach the electrodes E1, causing the electrode E2 to bend. Then, the AC voltage Vac1 is applied to the electrode E3, causing the electrodes E2 and E3 to vibrate, thereby generating sound waves. Since the first transistor 10 can be used to control whether the DC voltage Vdc1 is supplied to the electrode E2, when it is necessary to end the transmission mode of the ultrasonic sensor 1, the first transistor 10 can be turned off to immediately stop supplying the DC voltage Vdc1 to the electrode E2. When the electrode E2 is not provided with the DC voltage Vdc1, even if the electrode E3 may still receive other noise or the AC voltage Vac1, the vibration generated by the electrodes E2 and E3 will be very small and can be ignored. In one embodiment of the present invention, when it is necessary to end the transmission mode of the ultrasonic sensor 1, the control circuit 40 will simultaneously turn off the first transistor 10 and stop supplying the AC voltage Vac1 to the electrode E3. Since the DC voltage Vdc1 and the AC voltage Vac1 are separately applied to the electrodes E2 and E3, and the DC voltage Vdc1 is supplied to the electrode E2 through the first transistor 10, the timing of applying the DC voltage Vdc1 and the AC voltage Vac1 can be accurately controlled, enabling the ultrasonic sensor 1 to generate sound waves more correctly.

When the ultrasonic sensor 1 is in the transmission mode, the control circuit 40 can select m rows of the firsts CMUTs A from the M rows of the first CMUTs A, and ultrasonic waves will be generated through the selected m rows of the first CMUTs A in the aforementioned manner. Here, m can be equal to M, or it can be an integer less than M but greater than 1. In addition, the selected m rows of the first CMUTs A are adjacent to each other. When the distance between the ultrasonic sensor 1 and the object to be detected is too close, the control circuit 40 can make m less than M, and only use a portion of the rows of the first CMUTs A, thereby avoiding the use of too many rows of the first CMUTs A, which would reduce the imaging quality of the ultrasonic sensor 1.

When the ultrasonic sensor 1 is in the receive mode, the reference voltage Vgn2 is applied to the electrodes E4, the DC voltage Vdc2 is applied to the source Sb, and the control signal Vg2 is applied to the gate Gb to turn on the second transistor 20, thereby transmitting the DC voltage Vdc2 to the electrode E5 via the source Sb and the drain Db. At this time, the electrode E6 can be used to sense external sound waves. Furthermore, the distance between the electrode E6 and the electrodes E4 changes due to the sound waves, causing the capacitance value between the electrode E6 and the electrodes E4 and the charges stored in the electrode E6 to change correspondingly, thereby causing the electrode E6 to output the corresponding AC voltage Vac2. Therefore, by detecting the change in the AC voltage Vac2 output by the electrode E6, the ultrasonic sensor 1 can complete the corresponding ultrasonic imaging. Since the second transistor 20 can be used to control whether the DC voltage Vdc2 is supplied to the electrode E5, when it is necessary to end the receive mode of the ultrasonic sensor 1, the second transistor 20 can be turned off to immediately stop supplying the DC voltage Vdc2 to the electrode E5. When the electrode E5 is not provided with the DC voltage Vdc2, even if the electrode E6 may still receive subsequent sound waves, the vibration generated by the electrode E6 will be very small and can be ignored. Since the DC voltage Vdc2 is applied to the electrode E5, the AC voltage Vac2 is output through the electrode E6, and the electrodes E5 and E6 are respectively in the second metal layer M2 and the third metal layer M3, the timing of applying the DC voltage Vdc2 can be accurately controlled, enabling the ultrasonic sensor 1 to receive sound waves with a higher accuracy, thereby improving the signal-to-noise ratio (SNR) of the ultrasonic sensor 1.

When the ultrasonic sensor 1 is in the receive mode, the control circuit 40 can select n columns of the second CMUTs B from the N columns of the second CMUTs B, and receive ultrasonic waves through the selected n columns of the second CMUTs B and output the corresponding AC voltage Vac2 in the aforementioned manner. Here, n can be equal to N, or it can be an integer less than N but greater than 1. In addition, the selected n columns of the second CMUTs B are adjacent to each other. When the distance between the ultrasonic sensor 1 and the object to be detected is too close, the control circuit 40 can make n less than N, and only use a portion of the columns of the second CMUTs B, thereby avoiding the use of too many columns of the second CMUTs B, which would reduce the imaging quality of the ultrasonic sensor 1.

In the above embodiment, the operations of the ultrasonic sensor 1 in the transmission mode and the receive mode are illustrated by the example where the ultrasonic sensor 1 generates ultrasonic waves through the first CMUTs A and receives reflected ultrasonic waves through the second CMUTs B. In another embodiment, the ultrasonic sensor 1 generates ultrasonic waves through the second CMUTs B and receives reflected ultrasonic waves through the first CMUTs A. In such embodiment, when the ultrasonic sensor 1 is in the transmission mode, the reference voltage Vgn1 is applied to the electrodes E4, the DC voltage Vdc1 is applied to the source Sb, the control signal Vg1 is applied to the gate Gb, and the AC voltage Vac1 is applied to the electrode E6. Moreover, when the ultrasonic sensor 1 is in the receive mode, the reference voltage Vgn2 is applied to the electrodes E1, the DC voltage Vdc2 is applied to the source Sa, the control signal Vg2 is applied to the gate Ga, and the electrode E3 outputs the AC voltage Vac2 generated by the vibration due to the sound waves.

Figure 6:
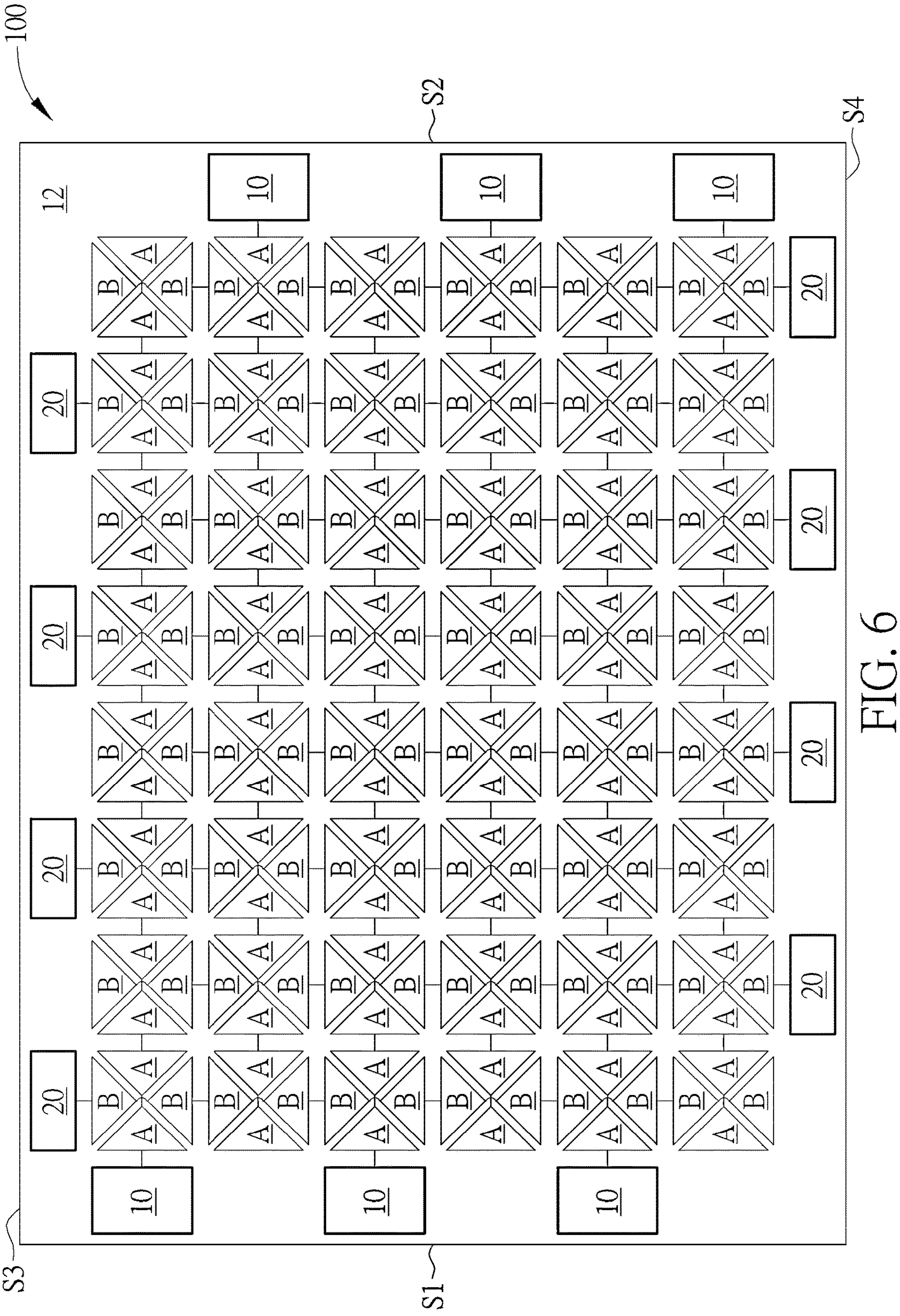
FIG. 6 is a top view of an ultrasonic sensor in another embodiment of the present invention.

Please refer again to FIG. 1, the first transistors 10 are arranged on the same side of the substrate 12 of the ultrasonic sensor 1, the second transistors 20 are arranged on the same side of the substrate 12 of the ultrasonic sensor 1, and the first transistors 10 and the second transistors 20 are set on different sides of the substrate 12 of the ultrasonic sensor 1. Please refer to FIG. 6, which is a top view of another embodiment of the ultrasonic sensor 100 of the present invention. The difference between the ultrasonic sensor 100 and the ultrasonic sensor 1 is only in the arrangements of the first transistors 10 and the second transistors 20. In the ultrasonic sensor 100, the odd-numbered first transistors 10 are arranged on the first side S1 of the substrate 12, the even-numbered first transistors 10 are arranged on the second side S2 of the substrate 12, the odd-numbered second transistors 20 are arranged on the third side S3 of the substrate 12, and the even-numbered second transistors 20 are arranged on the fourth side S4. The first side S1 is opposite to the second side S2, and the third side S3 is opposite to the fourth side S4.

Figure 7:
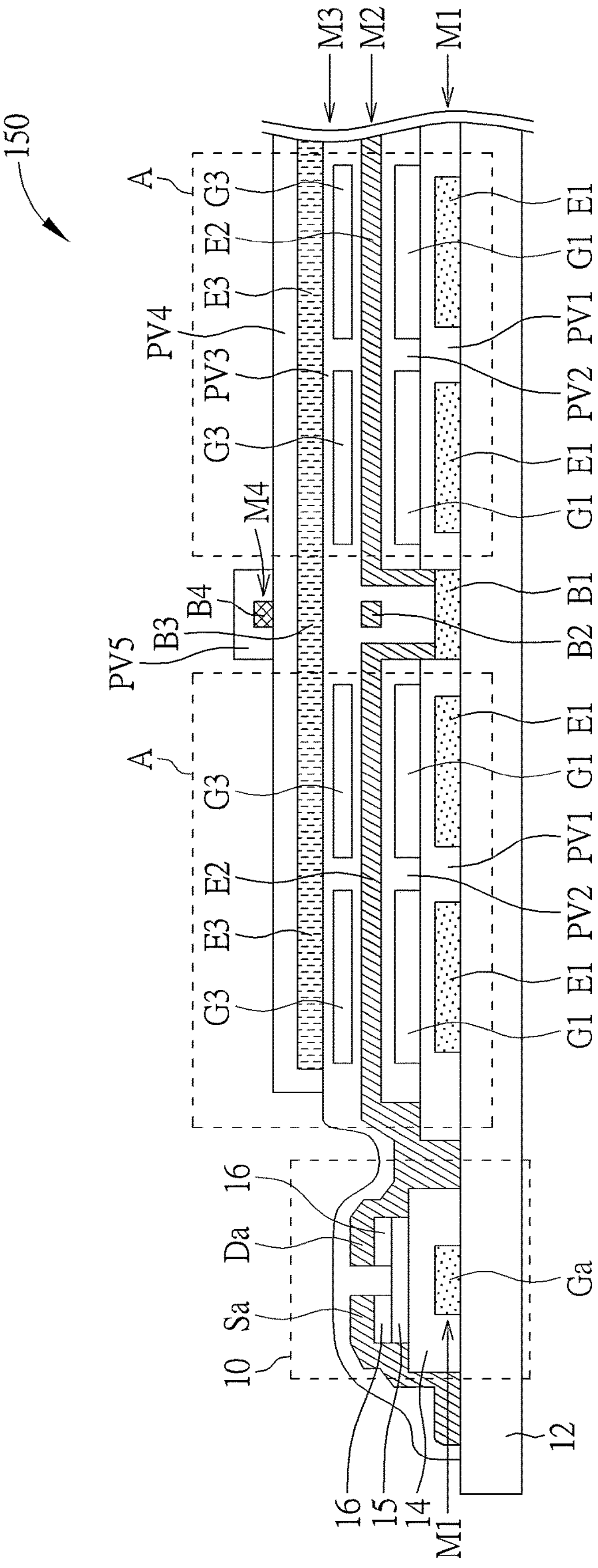
FIG. 7 is a sectional view of the ultrasonic sensor in another embodiment of the present invention.
Figure 8:
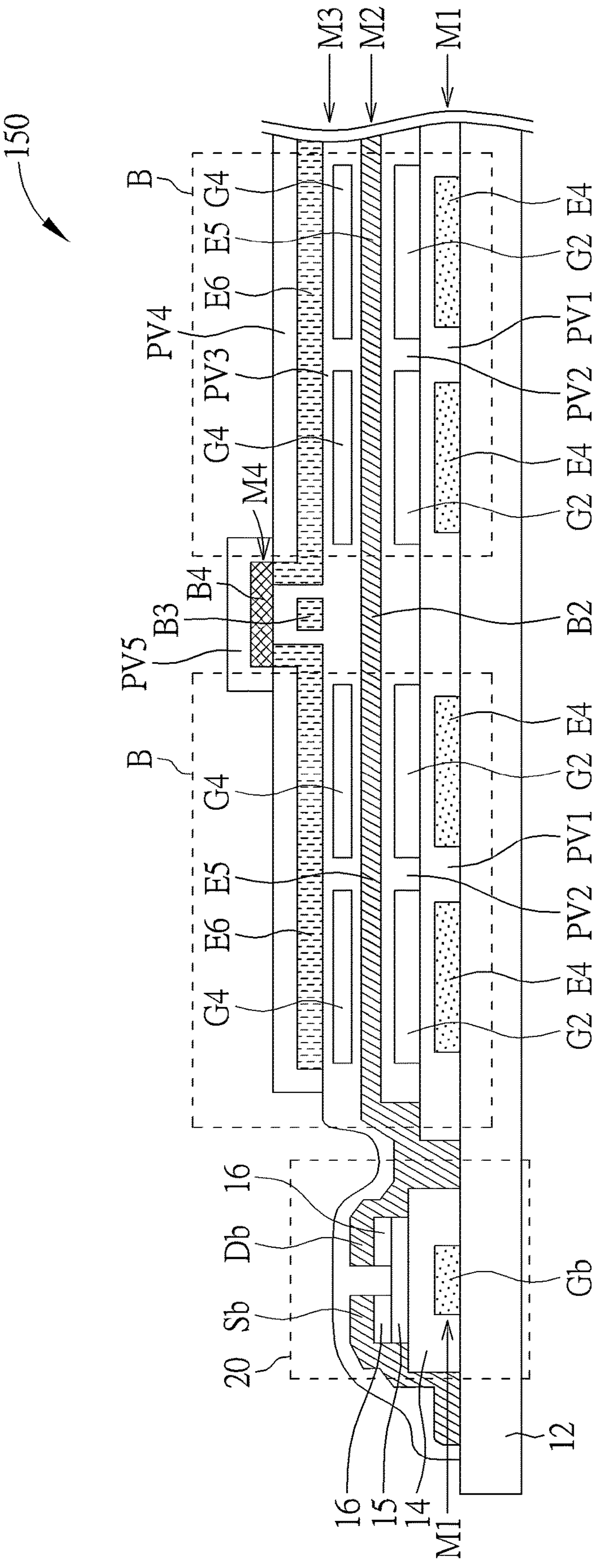
FIG. 8 is another sectional view of the ultrasonic sensor in FIG. 7.

Please refer to FIGS. 7 and 8. FIG. 7 is a sectional view of an ultrasonic sensor 150 in another embodiment of the present invention, and FIG. 8 is another sectional view of the ultrasonic sensor 150 in FIG. 7. The difference between the ultrasonic sensor 150 and the ultrasonic sensor 1 is that: each first CMUT A of the ultrasonic sensor 150 further forms a plurality of third cavities G3 between the electrodes E2 and E3, and each second CMUT B of the ultrasonic sensor 150 further forms a plurality of fourth cavities G4 between the electrodes E5 and E6.

In summary, the ultrasonic sensor in the embodiments of the present invention can accurately control the timing of applying the DC voltage and the AC voltage because the DC voltage and the AC voltage used for driving are applied to the electrodes located on different metal layers, and the DC voltage is supplied to the metal layer through a transistor. Therefore, when the ultrasonic sensor is in the transmitting mode, the ultrasonic sensor can accurately generate sound waves. Moreover, when the ultrasonic sensor is in the receive mode, the ultrasonic sensor can more accurately receive sound waves because the timing of applying the DC voltage can be accurately controlled, thereby improving the signal-to-noise ratio of the ultrasonic sensor. In addition, the ultrasonic sensor in the embodiment of the present invention can adaptively select all or part of the capacitive micromachined ultrasonic transducers to perform ultrasonic imaging according to the distance between the ultrasonic sensor and the object to be detected and imaged, so as to maintain the imaging quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ultrasonic sensor, comprising:

a plurality of first capacitive micromachined ultrasonic transducers (CMUTs) arranged in M rows, M being an integer greater than 1, each first CMUT comprising a plurality of first electrodes, a second electrode, and a third electrode, the first electrodes being used to receive a first reference voltage, the second electrode being used to receive a first direct-current (DC) voltage, the third electrode being used to receive a first alternating-current (AC) voltage, the first DC voltage being different from the first reference voltage, a plurality of first cavities being formed between the first electrodes and the second electrode; and a plurality of second CMUTs arranged in N columns, N being an integer greater than 1, the M rows being intersected with the N columns, each second CMUT comprising a plurality of fourth electrodes, a fifth electrode, and a sixth electrode, the fourth electrodes being used to receive a second reference voltage, the fifth electrode being used to receive a second DC voltage, the sixth electrode being used to generate a second AC voltage, a plurality of second cavities being formed between the fourth electrodes and the fifth electrode, the second DC voltage being different from the second reference voltage;

wherein the first electrodes of the each first CMUT and the fourth electrodes of the each second CMUT are formed in a first metal layer;

wherein the second electrode of the each first CMUT and the fifth electrode of the each second CMUT are formed in a second metal layer; and wherein the third electrode of the each first CMUT and the sixth electrode of the each second CMUT are formed in a third metal layer, and the second metal layer is formed between the first metal layer and the third metal layer.

2. The ultrasonic sensor of claim 1, wherein second electrodes of first CMUTs in a same row are coupled to each other by the first metal layer, and fifth electrodes of second CMUTs in a same column are coupled to each other by the second metal layer.

3. The ultrasonic sensor of claim 1, wherein third electrodes of first CMUTs in a same row are coupled to each other by the third metal layer, and sixth electrodes of second CMUTs in a same column are coupled to each other by a fourth metal layer.

4. The ultrasonic sensor of claim 1, wherein second electrodes of first CMUTs in a same row are coupled to each other by the second metal layer, and fifth electrodes of second CMUTs in a same column are coupled to each other by the first metal layer.

5. The ultrasonic sensor of claim 1, wherein third electrodes of first CMUTs in a same row are coupled to each other by a fourth metal layer, and sixth electrodes of second CMUTs in a same column are coupled to each other by the third metal layer.

6. The ultrasonic sensor of claim 1, wherein a plurality of third cavities are formed between the second electrode and the third electrode of the each first CMUT, and a plurality of fourth cavities are formed between the fifth electrode and the sixth electrode of the each second CMUT.

7. The ultrasonic sensor of claim 1, further comprising:

a plurality of first transistors, each first transistor comprising:

a first end coupled to second electrodes of first CMUTs arranged in one of the M rows;

a second end coupled to a direct-current (DC) voltage source for receiving the first DC voltage provided by the DC voltage source; and a control end for controlling electrical connection between the first end and the second end according to a first control signal; and a plurality of second transistors, each second transistor comprising:

a first end coupled to fifth electrodes of second CMUTs arranged in one of the N columns;

a second end coupled to the DC voltage source for receiving the second DC voltage provided by the DC voltage source; and a control end for controlling electrical connection between the first end of the each second transistor and the second end of the each second transistor according to a second control signal.

8. The ultrasonic sensor of claim 7, wherein the control end of the each first transistor and the control end of the each second transistor are formed in the first metal layer; and the first end of the each first transistor, the second end of the each first transistor, the first end of the each second transistor, and the second end of the each second transistor are formed in the second metal layer.

9. The ultrasonic sensor of claim 7, further comprising a substrate, wherein the first transistors are arranged on a same side of the substrate, the second transistors are arranged on a same side of the substrate, and the first transistors and the second transistors are arranged on different sides of the substrate.

10. The ultrasonic sensor of claim 7, further comprising a substrate, wherein odd-numbered first transistors of the first transistors are arranged on a first side of the substrate, even-numbered first transistors of the first transistors are arranged on a second side of the substrate opposite to the first side, odd-numbered second transistors of the second transistors are arranged on a third side of the substrate, and even-numbered second transistors of the second transistors are arranged on a fourth side of the substrate opposite to the third side.

11. A method for controlling an ultrasonic sensor that comprises a plurality of first capacitive micromachined ultrasonic transducers (CMUTs) arranged in M rows and a plurality of second CMUTs arranged in N columns, M and N each being an integer greater than 1, the M rows being intersected with the N columns, each first CMUT comprising a plurality of first electrodes, a second electrode, and a third electrode, a plurality of first cavities being formed between the first electrodes and the second electrode, each second CMUT comprising a plurality of fourth electrodes, a fifth electrode, and a sixth electrode, a plurality of second cavities being formed between the fourth electrodes and the fifth electrode, the method comprising:

in a transmission mode:

applying a first reference voltage to first electrodes of first CMUTs arranged in a plurality of selected rows of the M rows;

applying a first direct-current (DC) voltage to second electrodes of the first CMUTs arranged in the plurality of selected rows of the M rows, the first DC voltage being different from the first reference voltage; and applying a first alternating-current (AC) voltage to third electrodes of the first CMUTs arranged in the plurality of selected rows of the M rows; and in a receive mode:

applying a second reference voltage to fourth electrodes of second CMUTs arranged in a plurality of selected columns of the N columns;

applying a second DC voltage to fifth electrodes of the second CMUTs arranged in the plurality of selected columns of the N columns, the second DC voltage being different from the second reference voltage; and receiving second alternating-current (AC) voltages generated by sixth electrodes of the second CMUTs arranged in the plurality of selected columns of the N columns.

12. The method of claim 11, wherein the ultrasonic sensor further comprises a plurality of first transistors and a plurality of second transistors, each first transistor comprising a first end coupled to second electrodes of first CMUTs arranged in one of the M rows, a second end coupled to a direct-current (DC) voltage source for receiving the first DC voltage provided by the DC voltage source, and a control end for controlling electrical connection between the first end and the second end according to a first control signal, each second transistor comprising a first end coupled to fifth electrodes of second CMUTs arranged in one of the N columns, a second end coupled to the DC voltage source for receiving the second DC voltage provided by the DC voltage source, and a control end for controlling electrical connection between the first end of the each second transistor and the second end of the each second transistor according to a second control signal; and wherein the method further comprises:

in the transmission mode:

transmitting a plurality of first control signals to control ends of a plurality of selected first transistors to select the first CMUTs arranged in the plurality of selected rows of the M rows; and in the receive mode:

transmitting a plurality of second control signals to control ends of a plurality of selected second transistors to select the second CMUTs arranged in the plurality of selected columns of the N columns.

* * * * *